United States Patent
Matsuda

(10) Patent No.: US 9,037,311 B2
(45) Date of Patent: May 19, 2015

(54) ROAD SURFACE SLOPE ESTIMATING DEVICE

(71) Applicant: Nissan Motor Co., Ltd., Yokohama-shi, Kanagawa (JP)

(72) Inventor: Takashi Matsuda, Isehara (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 177 days.

(21) Appl. No.: 13/792,640

(22) Filed: Mar. 11, 2013

(65) Prior Publication Data

US 2013/0238164 A1 Sep. 12, 2013

(30) Foreign Application Priority Data

Mar. 12, 2012 (JP) ................. 2012-053977

(51) Int. Cl.
*G06F 17/00* (2006.01)
*B60W 40/076* (2012.01)
*B60W 50/00* (2006.01)

(52) U.S. Cl.
CPC ............. *G06F 17/00* (2013.01); *B60W 40/076* (2013.01); *B60W 2050/0052* (2013.01); *B60W 2520/10* (2013.01); *B60W 2520/105* (2013.01)

(58) Field of Classification Search
CPC ...... G06F 3/017; B60G 17/06; B60G 17/015; B60G 17/016; B60G 17/0195; B60G 2300/122; B60G 2300/45; B60G 2400/102; B60G 2500/10
USPC .............................................................. 701/1
See application file for complete search history.

(56) References Cited

U.S. PATENT DOCUMENTS

2009/0043473 A1* 2/2009 Nakai et al. ..................... 701/70

FOREIGN PATENT DOCUMENTS

JP 2009-040308 2/2009

* cited by examiner

*Primary Examiner* — James Trammell
*Assistant Examiner* — James E Stroud
(74) *Attorney, Agent, or Firm* — Young Basile

(57) ABSTRACT

A road surface slope estimating device changes filter characteristics of a filter with respect to a detected vehicle body attitude value in accordance with an actual rate of change of road surface slope so as to enhance the filter characteristics when the rate of change of the road surface slope is low and to degrade the filter characteristics when the rate of change of the road surface slope is high.

5 Claims, 5 Drawing Sheets

ROAD SURFACE SLOPE ESTIMATING DEVICE

TECHNICAL FIELD

The present invention relates to a road surface slope estimating device.

BACKGROUND

Japanese Unexamined Patent Application Publication No. 2009-040308 discloses a technology for, when estimating a road surface slope using a value detected by an acceleration sensor and a differentiated value of a vehicle speed determined by a wheel speed sensor, removing by using a low-pass filter noise components caused by changes in the attitude (squat, dive, shift shock) of a vehicle body or input disturbances of a road surface (such as irregularities).

In the technology of the related art described above, since the intensity of the filter is constant with respect to a change in road surface slope, the traceability of an estimated road surface slope to an actual change in road surface slope deteriorates as the rate of change of the road surface slope increases, resulting in a large estimation error.

BRIEF SUMMARY

The present invention provides a road surface slope estimating device capable of achieving both noise immunity and responsiveness with respect to a change in road surface slope.

In an aspect of the present invention, filter characteristics of a filtering unit with respect to a detected vehicle body attitude value are changed in accordance with the actual rate of change of road surface slope so that the filter characteristics are enhanced when the rate of change of the road surface slope is low and the filter characteristics are degraded when the rate of change of the road surface slope is high.

If the rate of change of the road surface slope is high, the filter characteristics may be degraded to improve the traceability to the rate of change of the road surface slope. In this case, noise superimposed on the detected vehicle body attitude value is small, and thus noise immunity may not be impaired.

If the rate of change of the road surface slope is low, in contrast, the filter characteristics may be enhanced to improve noise immunity. In this case, the traceability of the estimated road surface slope to an actual change in road surface slope is high, and thus the traceability to the rate of change of the road surface slope may not be impaired.

In accordance with the present invention, therefore, both noise immunity and responsiveness with respect to a change in road surface slope may be achieved.

BRIEF DESCRIPTION OF THE DRAWINGS

The description herein makes reference to the accompanying drawings wherein like reference numerals refer to like parts throughout the several views, and wherein.

DETAILED DESCRIPTION

A road surface slope estimating device according to embodiments of the present invention will be described hereinafter with reference to the drawings.

First, a configuration according to a first embodiment will be described.

Figure 1:
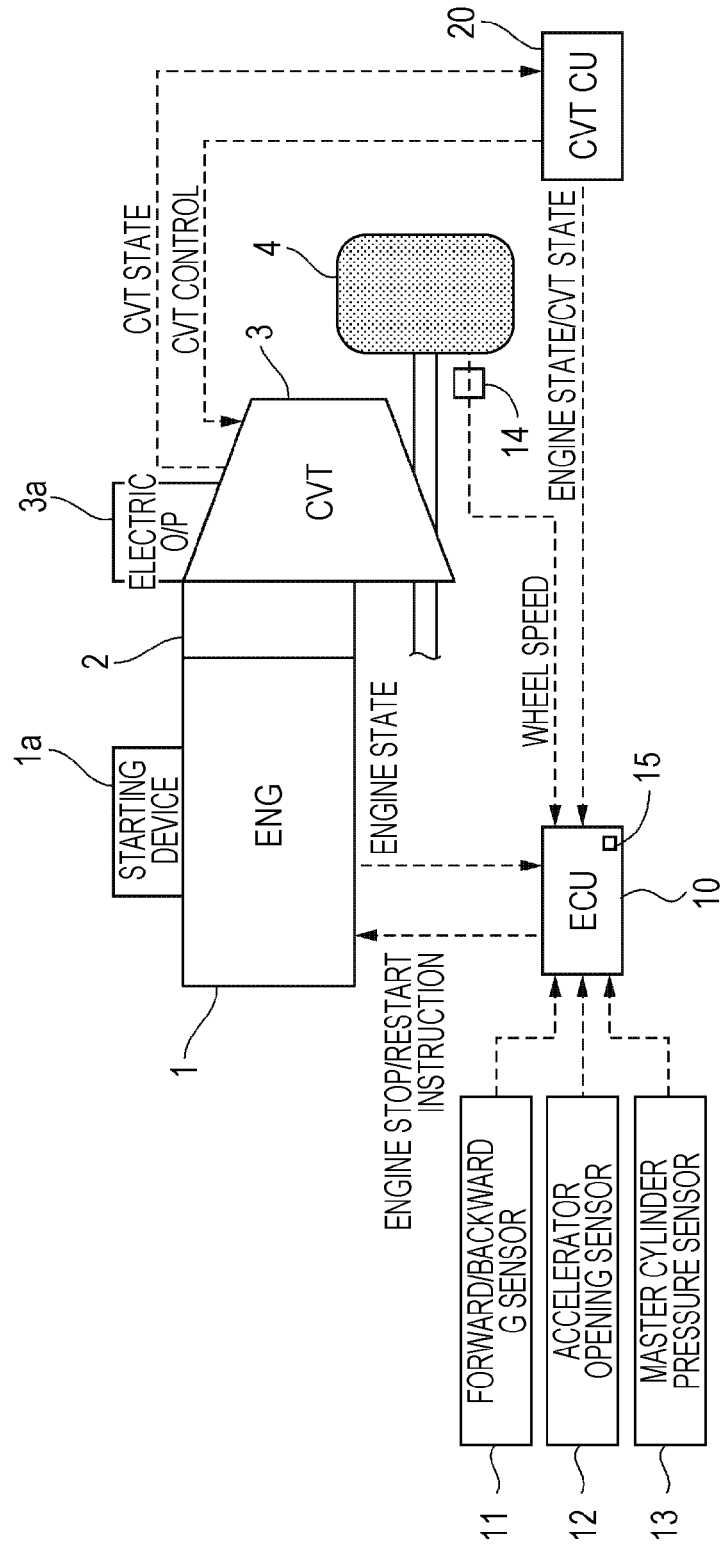
FIG. 1 is a system diagram illustrating an engine automatic stop control apparatus according to a first embodiment.

FIG. 1 is a system diagram illustrating an engine automatic stop control apparatus according to the first embodiment. A rotational drive force input from an engine 1 is input to a belt continuously variable transmission (CVT) 3 through a torque converter 2, and is transmitted to drive wheels 4 after the speed of the rotational drive force has been changed with a desired transmission gear ratio.

The engine 1 includes a starting device 1a that initiates an engine start process. Specifically, the engine 1 is equipped with a starter motor, with which engine cranking is performed in accordance with an engine start instruction and fuel is injected into the engine 1. When the engine 1 becomes rotating in a self-sustaining manner, the starter motor is stopped.

The torque converter 2 is provided on the output side of the engine 1. The torque converter 2 includes a lock-up clutch to amplify the torque at parking speeds and to prohibit relative rotation at speeds greater than or equal to a certain vehicle speed (for example, appropriately 14 km/h). The belt CVT 3 is connected to the output side of the torque converter 2.

The belt CVT 3 includes a start clutch, a primary pulley, a secondary pulley, and a belt stretched across the pulleys, and the groove widths of the pulleys are changed by hydraulic control to achieve a desired transmission gear ratio. The belt CVT 3 further includes an oil pump driven by the engine 1. When the engine 1 is activated, a converter pressure and lock-up clutch pressure of the torque converter 2 are supplied from the oil pump serving as a hydraulic pressure source, and a pulley pressure and clutch engagement pressure of the belt CVT 3 are further supplied.

The belt CVT 3 further includes an electric oil pump 3a. When it is difficult to supply a hydraulic pressure using the oil pump because the engine 1 has been automatically stopped, the electric oil pump 3a is activated to enable necessary hydraulic pressures to be supplied to the individual actuators. Thus, even while the engine 1 is not running, the desired transmission gear ratio may be achieved, and the clutch engagement pressure may be maintained.

The operation state of the engine 1 is controlled by an engine control unit (automatic stop and restart control means) 10. The engine control unit 10 receives a forward/backward G signal input from a forward/backward G sensor (acceleration detecting means) 11 that detects the forward/backward acceleration of the vehicle, an accelerator signal input from an accelerator opening sensor 12 that detects the amount of accelerator pedal (or gas pedal) operation by a driver who drives the vehicle, a braking operation amount signal (master cylinder pressure) input from a master cylinder pressure sensor 13 that detects a master cylinder pressure generated in accordance with the amount of braking operation, wheel speed signals input from wheel speed sensors 14 provided on the individual wheels, a CVT state signal input from a CVT control unit 20 described below, and signals indicating an engine coolant temperature, a crank angle, an engine rotational speed, and so forth. The engine control unit 10 causes the engine 1 to start or automatically stop in accordance with the various signals described above. The master cylinder pressure sensor 13 may be replaced by a pedal force sensor that detects the brake pedal stroke amount or the brake pedal force, a sensor that detects the wheel cylinder pressure, or the like to detect the amount of operation of the brake pedal.

The CVT control unit 20 transmits and receives the signals of the engine operation state and CVT state to and from the engine control unit 10, and controls the transmission gear ratio and the like of the belt CVT 3 in accordance with the signals. Specifically, when the driving range is selected, the CVT control unit 20 engages the start clutch, determines a transmission gear ratio from a transmission gear ratio map in accordance with the accelerator pedal opening and the vehicle speed, and controls the individual pulley hydraulic pressures. Further, the CVT control unit 20 disengages the lock-up clutch when the vehicle speed is less than a certain vehicle speed, and engages the lock-up clutch to directly connect the engine 1 and the belt CVT 3 when the vehicle speed is greater than or equal to the certain vehicle speed. In addition, while the driving range is selected and the engine 1 is automatically stopped, the CVT control unit 20 causes the electric oil pump 3*a* to operate to reserve the necessary hydraulic pressure.

Next, an engine automatic stop control process of the engine control unit 10 will be described. In the first embodiment, when the vehicle is at rest, the engine is turned off to stop idling, called idle-stop, or stop-start, if certain conditions are met. The stop-start control will not be described in detail herein because known stop-start technology may be used, as desired. In addition, when the vehicle is decelerating even during traveling and presumably will stop and perform stop-start control, coast stop control for stopping the engine 1 is performed.

When freewheeling, or coasting, without the driver operating the accelerator pedal (including the state where the driver is operating the brake pedal), a stop-start vehicle in which normal coast stop control is not performed stops fuel injection to maintain the engine rotational speed through the lock-up clutch by using a coast torque transmitted from the drive wheels 4. Since the lock-up clutch is disengaged when the vehicle decelerates to a certain vehicle speed, the engine 1 will stop unless fuel is injected into the engine 1. To avoid the situation, fuel injection is resumed at the time when the lock-up clutch is disengaged to maintain the self-sustaining rotation of the engine. After that, the vehicle completely stops, and it is determined whether various conditions such as a condition that the brake pedal is fully depressed are met or not. Then, idling of the engine 1 is stopped.

In a process of resuming fuel injection from a traveling state in which fuel injection has been stopped and then again stopping the engine, the amount of fuel spent when fuel injection is resumed is further reduced, thus enabling improvement in fuel economy. To this end, during coasting during which the certain conditions are met, coast stop control in which the engine is not still running (without fuel injection) is performed without resuming fuel injection, and transitions directly to normal stop-start control after the vehicle has stopped.

The coast stop control is initiated (the engine is stopped) when all the following four conditions are met, and the engine is restarted when any one of the following four conditions is not met:

(1) The amount of accelerator pedal operation is zero.

(2) The driving range is selected.

(3) The vehicle speed is less than or equal to a reference vehicle speed (vehicle speed at which the lock-up clutch is disengaged).

(4) The amount of braking operation is greater than or equal to a coast stop allowable lower limit.

The coast stop allowable lower limit is set to be a higher value for a larger road surface slope.

Further, the stop-start control is initiated (the engine is stopped) when all the following four conditions are met, and the engine is restarted when any one of the following four conditions is not met:

(1) The amount of accelerator pedal operation is zero.

(2) The driving range is selected.

(3) A vehicle speed of zero continues for a certain amount of time.

(4) The amount of braking operation is greater than or equal to a stop-start allowable lower limit.

The stop-start allowable lower limit is set to be a higher value for a larger road surface slope, and is also set to be a higher value than the coast stop allowable lower limit.

The engine control unit 10 includes a road surface slope estimating device 15 configured to estimate a road surface slope that defines the coast stop allowable lower limit and the stop-start allowable lower limit.

Figure 2:
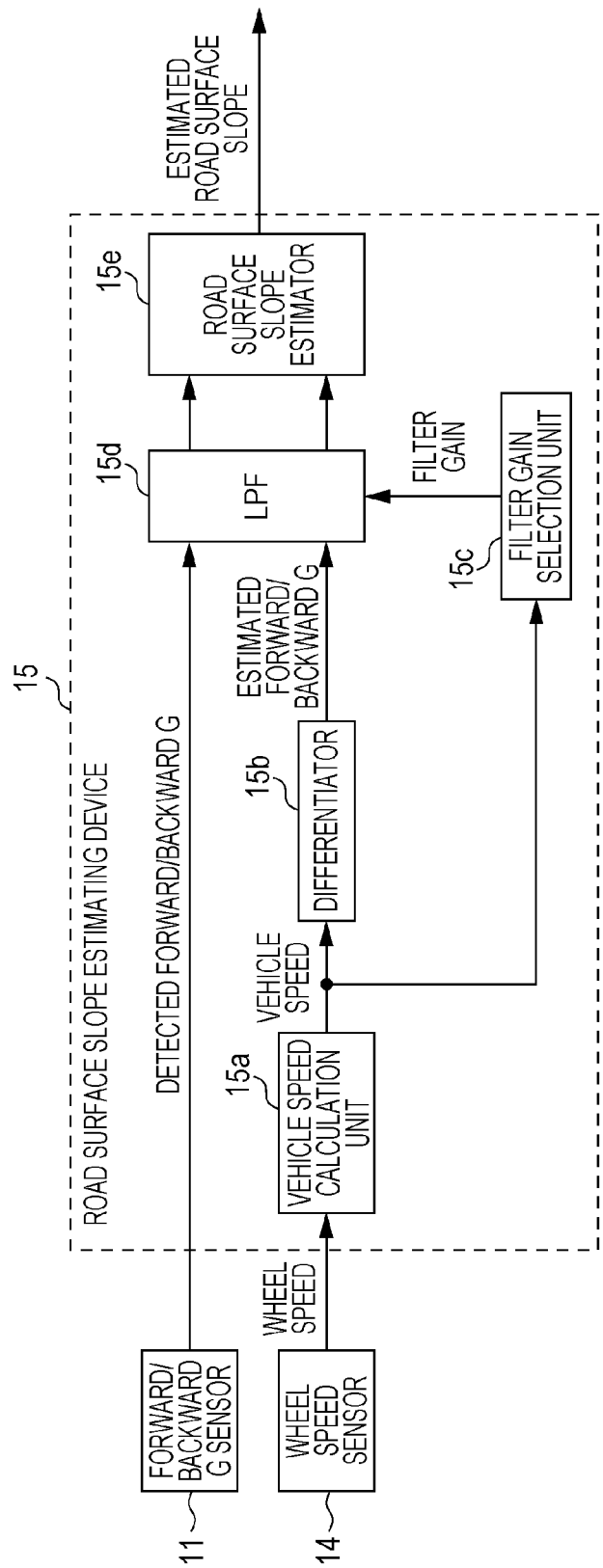
FIG. 2 is a control block diagram of a road surface slope estimating device according to the first embodiment.

FIG. 2 is a control block diagram of the road surface slope estimating device 15 according to the first embodiment.

A vehicle speed calculation unit (road surface slope change rate estimating means, vehicle speed detecting means) 15*a* calculates a vehicle speed in accordance with the wheel speeds detected by the individual wheel speed sensors 14. The vehicle speed is, for example, the mean value of the wheel speeds of follower wheels.

A differentiator (vehicle attitude detecting means) 15*b* differentiates the calculated vehicle speed with respect to time to output an estimated forward/backward acceleration (estimated forward/backward G, or G force).

A filter gain selection unit (filter characteristic changing means) 15*c* selects a filter gain of a low-pass filter (filtering means) 15*d* in accordance with the vehicle speed. Since a filter gain is the inverse of the time constant of a filter, the time constant, or cutoff frequency, of the filter is determined once the filter gain is selected. The method for selecting a filter gain will be described below.

The low-pass filter 15*d* receives the forward/backward G (detected forward/backward G) detected by the forward/backward G sensor 11 and the estimated forward/backward G, performs a filtering process using the selected filter gain, and outputs a detected forward/backward G and an estimated forward/backward G obtained by removing noise from the detected forward/backward G and the estimated forward/backward G, respectively.

A road surface slope estimator (road surface slope estimating means) 15*e* subtracts the estimated forward/backward G with noise removed from the detected forward/backward G subjected to the filtering process, and outputs the resulting value as an estimated road surface slope.

Figure 3:
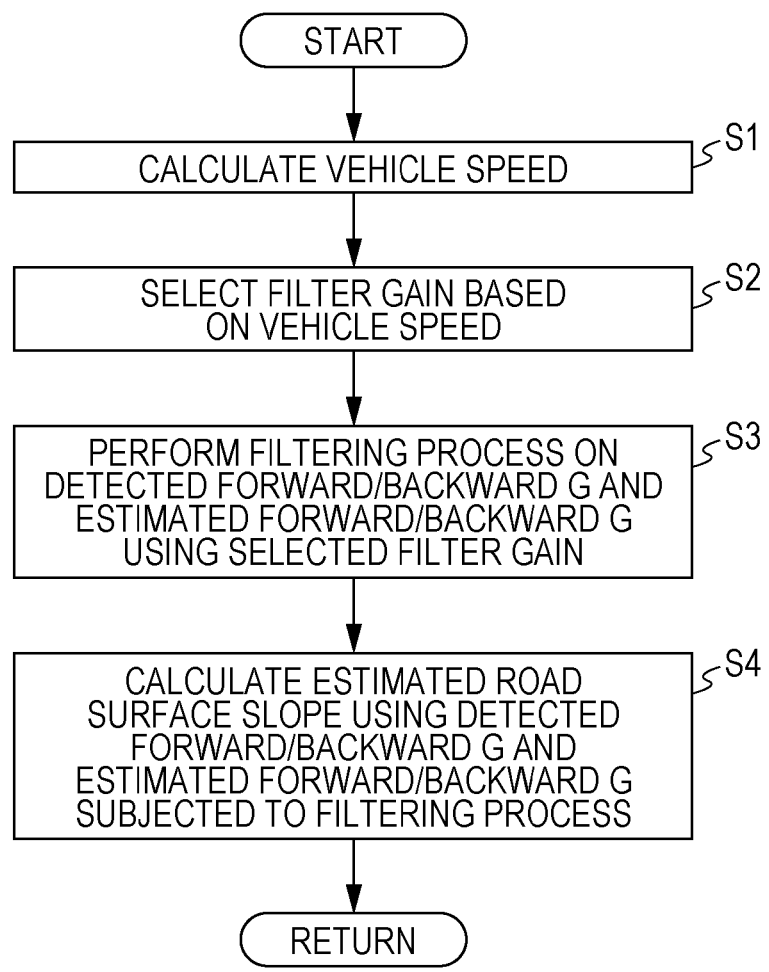
FIG. 3 is a flowchart illustrating a procedure of a road surface slope estimation process performed by the road surface slope estimating device according to the first embodiment.

FIG. 3 is a flowchart illustrating a procedure of a road surface slope estimation process performed by the road surface slope estimating device 15 according to the first embodiment. Individual steps will be described hereinafter.

In step S1, the vehicle speed calculation unit 15a calculates a vehicle speed.

Figure 4:
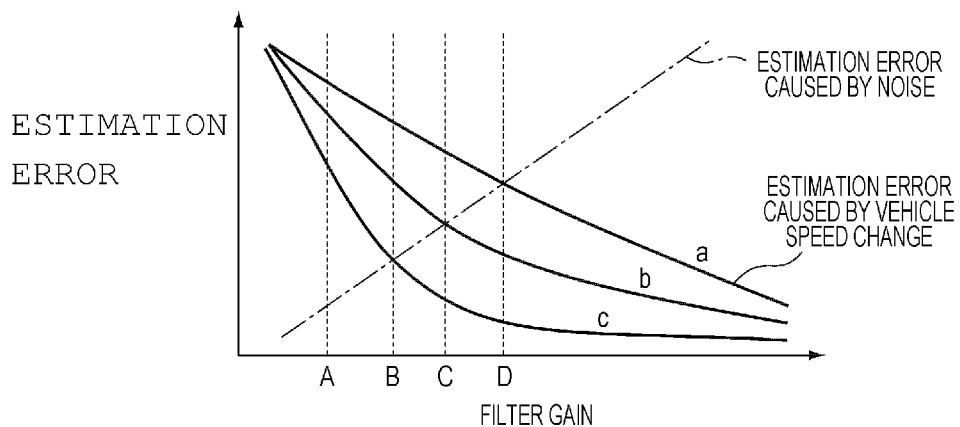
FIG. 4 is a filter gain selection map according to the first embodiment.

In step S2, the filter gain selection unit 15c selects a filter gain using the vehicle speed by referring to a map illustrated in FIG. 4.

FIG. 4 is a filter gain selection map according to the first embodiment. The filter gain is the intersection of a characteristic curve (solid line) representing an estimation error depending on vehicle speed and a characteristic curve (one-dot chain line) representing an estimation error caused by noise. As illustrated in FIG. 4, the estimation error depending on vehicle speed has a characteristic that increases as the filter gain decreases and that increases as the vehicle speed increases. In contrast, the estimation error caused by noise has a characteristic that increase as the filter gain increases.

In FIG. 4, the vehicle speeds a, b, and c have a relationship of a>b>c. For example, a filter gain D is employed when the vehicle speed is a, a filter gain C is employed when the vehicle speed is b, and a filter gain B is employed when the vehicle speed is c.

In step S3, the low-pass filter 15d performs a filtering process on the detected forward/backward G and the estimated forward/backward G using the selected filter gain.

In step S4, the road surface slope estimator 15e calculates an estimated road surface slope based on the detected forward/backward G and estimated forward/backward G subjected to the filtering process.

Figure 5A:
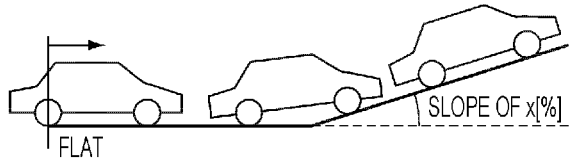
FIGS. 5A and 5B are diagrams illustrating the output of a forward/backward G sensor when the slope of the road surface on which the vehicle is traveling changes.
Figure 5B:

FIGS. 5A and 5B are diagrams illustrating the output of the forward/backward G sensor 11 when the slope of the road surface on which the vehicle is traveling changes. As illustrated in FIG. 5A, when the road on which the vehicle is traveling changes from being flat to hilly, the vehicle enters the hill with the front wheels first and then the rear wheels. Thus, the output of the forward/backward G sensor 11 changes from a value before the slope change to a value after the slope change in a manner indicated by a solid line in FIG. 5B. The broken line indicates the output of the forward/backward G sensor 11 when it is assumed that the front and rear wheels instantaneously enter the hill.

The gradient obtained when the output of the forward/backward G sensor 11 changes from the value before the slope change to the value after the slope change represents the rate of change of the road surface slope, where the larger the amount of change of the road surface slope or the shorter the change duration, the steeper the gradient.

Figure 6A:
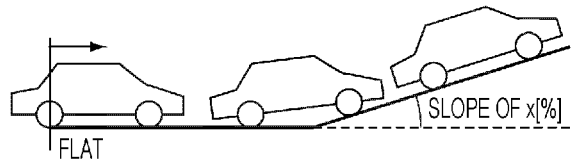
FIGS. 6A and 6B are diagrams illustrating the output of the forward/backward G sensor, which has been transmitted through a low-pass filter, when the slope of the road surface on which the vehicle is traveling changes.
Figure 6B:
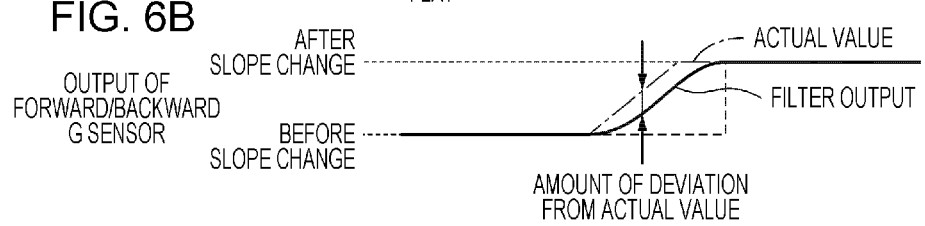

FIGS. 6A and 6B are diagrams illustrating the output of the forward/backward G sensor 11, which has been transmitted through the low-pass filter 15d, when the slope of the road surface on which the vehicle is traveling changes. As indicated by a solid line in FIG. 6B, the output (filter output value) of the forward/backward G sensor 11, which has been transmitted through the low-pass filter 15d, deviates from the actual value indicated by a one-dot chain line. The amount of deviation from the actual value increases as the rate of change of the road surface slope increases if the filter gain of the low-pass filter 15d is constant.

Figure 7A:
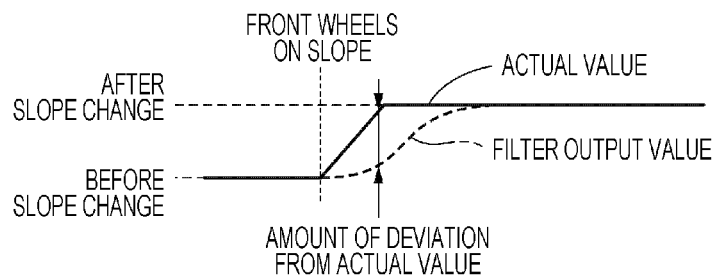
FIGS. 7A and 7B are time charts illustrating the output of the forward/backward G sensor when the filter gain of the low-pass filter is set by taking into account only the estimation error caused by noise.
Figure 7B:
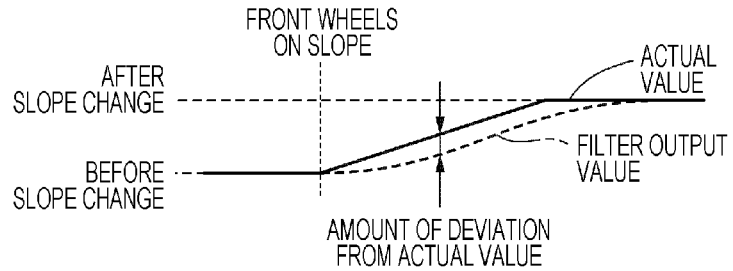

FIGS. 7A and 7B are time charts illustrating the output of the forward/backward G sensor 11 when the filter gain of the low-pass filter 15d is set by taking into account only the characteristic of the estimation error caused by noise. FIG. 7A illustrates the case where the vehicle speed is high, and FIG. 7B illustrates the case where the vehicle speed is low.

In a case where a filter gain is selected with an emphasis on noise immunity (noise removal performance) without taking into account traceability to the rate of change of the road surface slope (for example, in a case where a filter gain A illustrated in FIG. 4 is selected), as illustrated in FIG. 7A, a large deviation occurs between the output value subjected to the filtering process (filter output value) and the actual value when the road surface slope changes in a high-vehicle-speed region or when the rate of change of the road surface slope is high. In a low-vehicle-speed region, on the other hand, the rate of change of the actual value is low. Thus, as illustrated in FIG. 7B, the output value subjected to the filtering process is fully traceable to the actual value. Thus, the deviation from the actual value is small, leading to a reduction in detriment caused by emphasizing noise immunity.

In a system in which a filter gain of a low-pass filter is set by taking into account only noise immunity, therefore, an estimation error caused by noise may be kept low while an estimation error caused by a change in road surface slope results in an increase in the total estimation error. Such a system might not be well-balanced.

In contrast, the road surface slope estimating device 15 according to the first embodiment selects an optimum filter gain that takes into account noise immunity and responsiveness (traceability to the rate of change of the road surface slope), thereby establishing a system having an excellent balance between both indices.

Specifically, in the road surface slope estimation process illustrated in FIG. 3, in step S1, a vehicle speed is calculated, and in step S2, the filter gain of the low-pass filter 15d is selected based on the vehicle speed by referring to the map illustrated in FIG. 4. In this case, the filter gain that is the intersection of the characteristic curve representing the estimation error depending on vehicle speed and the characteristic curve representing the estimation error caused by noise is selected. Here, the estimation error depending on vehicle speed is equivalent to the estimation error corresponding to the rate of change of the road surface slope. The reason for this is that the rate of change of the road surface slope increases as the vehicle speed increases.

Thus, if the rate of change of the road surface slope is high, the filter gain may be increased to improve the traceability to the rate of change of the road surface slope. Since the amount of noise superimposed on the detected forward/backward G and estimated forward/backward G is small, noise immunity may not be impaired.

If the rate of change of the road surface slope is low, in contrast, the filter gain may be reduced to improve noise immunity. Since the traceability of the estimated road surface slope to an actual change in road surface slope is high, the traceability to the rate of change of the road surface slope may not be impaired.

Consequently, the road surface slope estimating device 15 according to the first embodiment may achieve an optimum balance between both indices, and may minimize, as a system, an estimation error which may be generated.

The road surface slope estimating device according to the first embodiment may achieve the following advantages:

(1) The road surface slope estimating device includes a forward/backward G sensor that outputs a detected forward/backward G of a vehicle, a differentiator 15b that calculates an estimated forward/backward G of the vehicle, a low-pass filter 15d that performs a filtering process on the detected forward/backward G and the estimated forward/backward G to remove noise, a road surface slope estimator 15e that estimates a road surface slope in accordance with signals corresponding to the detected forward/backward G and estimated forward/backward G subjected to the filtering process, a road surface slope change rate estimating means (vehicle speed calculation unit 15a) that estimates an actual rate of change of the road surface slope (which is substantially equal to the vehicle speed), and a filter gain selection unit 15c that changes the filter characteristics of the low-pass filter 15d with respect to the detected forward/backward G and estimated forward/backward G subjected to the filtering process in accordance with the actual rate of change of the road surface slope so as to reduce the filter gain when the rate of change of the road surface slope is low and to increase the filter gain when the rate of change of the road surface slope is high. Therefore, both noise immunity and responsiveness with respect to a change in road surface slope may be achieved.

(2) The low-pass filter 15d performs a filtering process on the detected forward/backward G and the estimated forward/backward G. Therefore, the noise components superimposed on the detected forward/backward G and the estimated forward/backward G due to a change in the attitude of the vehicle body or input disturbances of the road surface may be reduced.

(3) The filter gain selection unit 15c selects the filter characteristics that minimize the total estimation error which is the sum of the estimation error in road surface slope caused in accordance with noise and the estimation error in road surface slope caused in accordance with the actual rate of change of the road surface slope. Therefore, an estimation error in road surface slope may be minimized.

(4) The road surface slope change rate estimating means is the vehicle speed calculation unit 15a that detects a vehicle speed. Therefore, the rate of change of road surface slope may be accurately estimated without adding a new configuration.

While a road surface slope estimating device according to some embodiments of the present invention has been described, the present invention is not limited to the foregoing configuration and any other configuration may be used without departing from the scope of the present invention.

For example, the foregoing embodiment provides an example in which the present invention is applied to an engine automatic stop control apparatus. The present invention may also be applied to any control apparatus that controls a vehicle using a road surface slope as a parameter, and may achieve operation and advantages similar to those of the foregoing embodiment.

Further, the vehicle attitude detecting means may be implemented as a yaw rate sensor that detects a yaw rate in the pitching direction.

What is claimed is:

1. A road surface slope estimating device comprising:
a vehicle attitude detecting unit configured to detect an attitude of a vehicle body of a vehicle;
a filtering unit configured to perform a filtering process on a detected vehicle body attitude value obtained by the vehicle attitude detecting unit to remove noise;
a road surface slope estimating unit configured to estimate a road surface slope in accordance with a signal corresponding to the vehicle body attitude value subjected to the filtering process;
a road surface slope change rate estimating unit configured to estimate an actual rate of change of the road surface slope; and
a filter characteristic changing unit configured to change filter characteristics of the filtering unit with respect to the detected vehicle body attitude value in accordance with the actual rate of change of the road surface slope so as to enhance the filter characteristics when the actual rate of change of the road surface slope is low and configured to degrade the filter characteristics when the rate of change of the road surface slope is high.

2. The road surface slope estimating device according to claim 1, wherein the attitude of the vehicle includes a forward/backward acceleration of the vehicle and a vehicle speed of the vehicle, and the filtering unit performs the filtering process on one of the forward/backward acceleration and the vehicle speed.

3. The road surface slope estimating device according to claim 1, wherein the filter characteristic changing unit selects filter characteristics that minimize a total estimation error, the total estimation error being a sum of an estimation error in road surface slope caused in accordance with the noise and an estimation error in road surface slope caused in accordance with the actual rate of change of the road surface slope.

4. The road surface slope estimating device according to claim 1, wherein the road surface slope change rate estimating unit is a vehicle speed detecting unit configured to detect a vehicle speed of the vehicle.

5. A road surface slope estimating device comprising:
means for detecting an attitude of a vehicle body of a vehicle;
means for performing a filtering process on a detected vehicle body attitude value obtained by the means for detecting the attitude to remove noise;
means for estimating a road surface slope in accordance with a signal corresponding to the vehicle body attitude value subjected to the filtering process;
means for estimating an actual rate of change of the road surface slope; and
means for changing filter characteristics of the means for performing the filtering process with respect to the detected vehicle body attitude value in accordance with the actual rate of change of the road surface slope so as to enhance the filter characteristics when the rate of change of the road surface slope is low and to degrade the filter characteristics when the rate of change of the road surface slope is high.

* * * * *